June 17, 1958  J. M. WARD  2,838,786
APPARATUS FOR EXTRACTING CRAB MEAT
Filed July 20, 1955  3 Sheets-Sheet 1
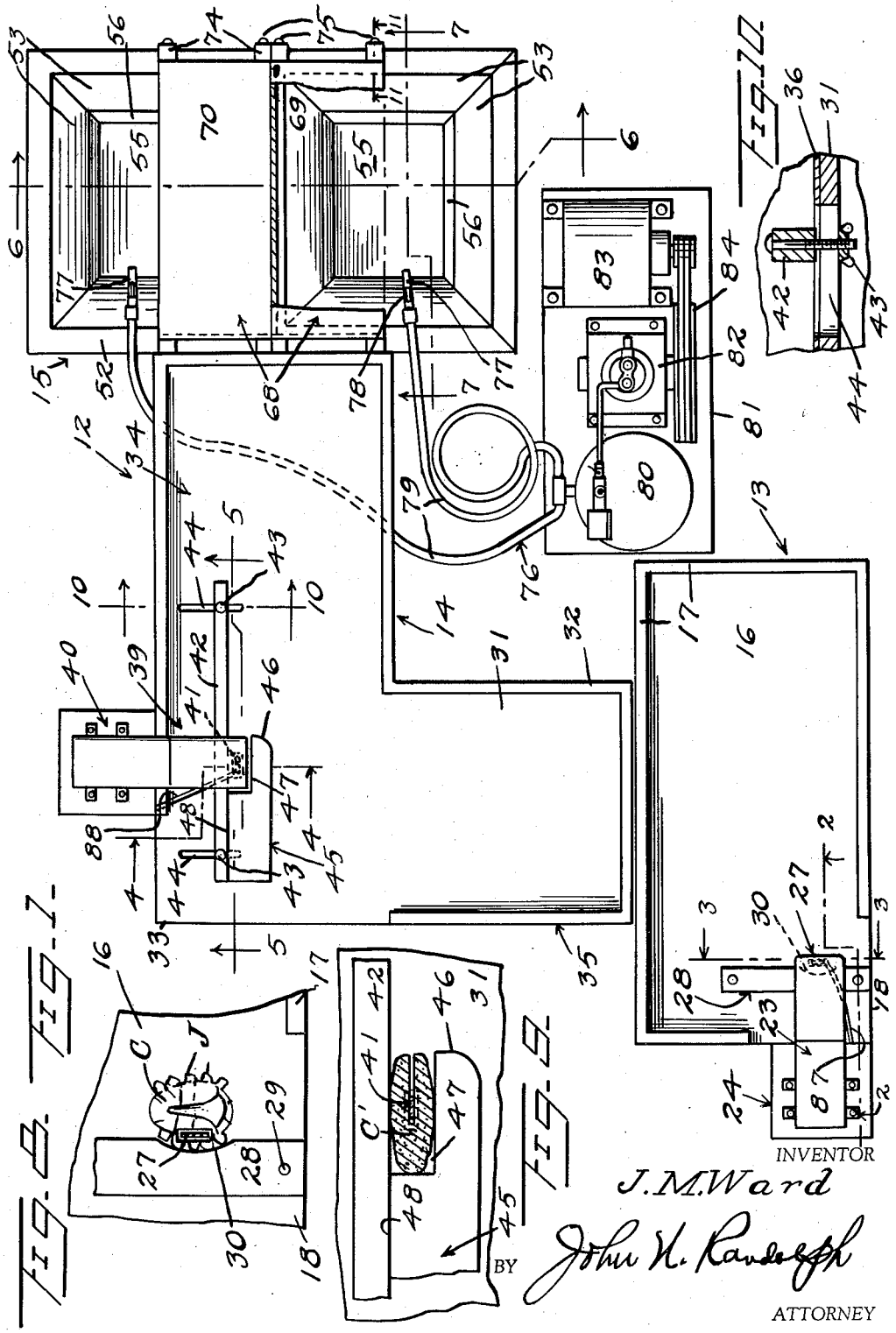
INVENTOR
J. M. Ward
BY John H. Randolph
ATTORNEY

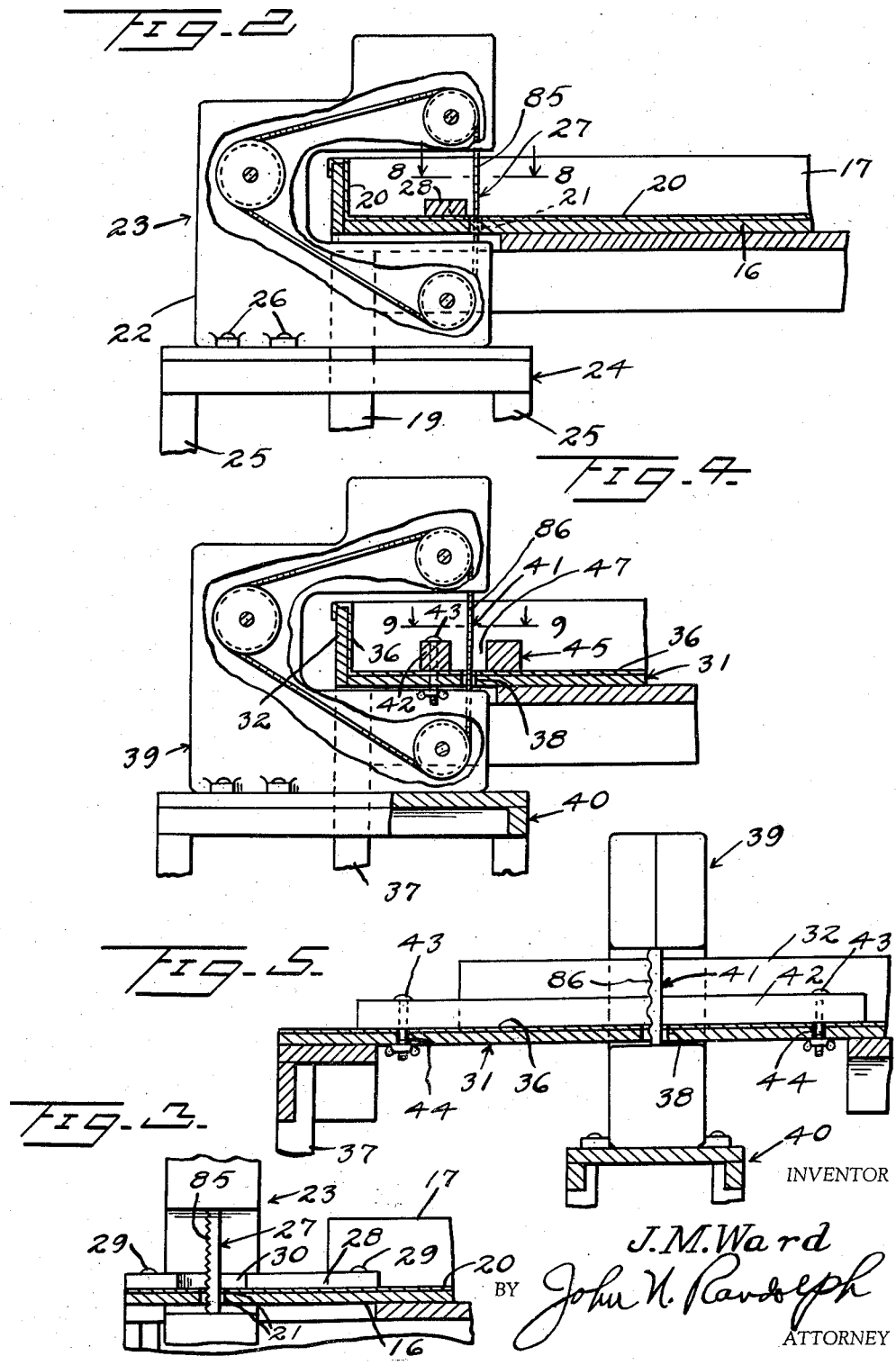

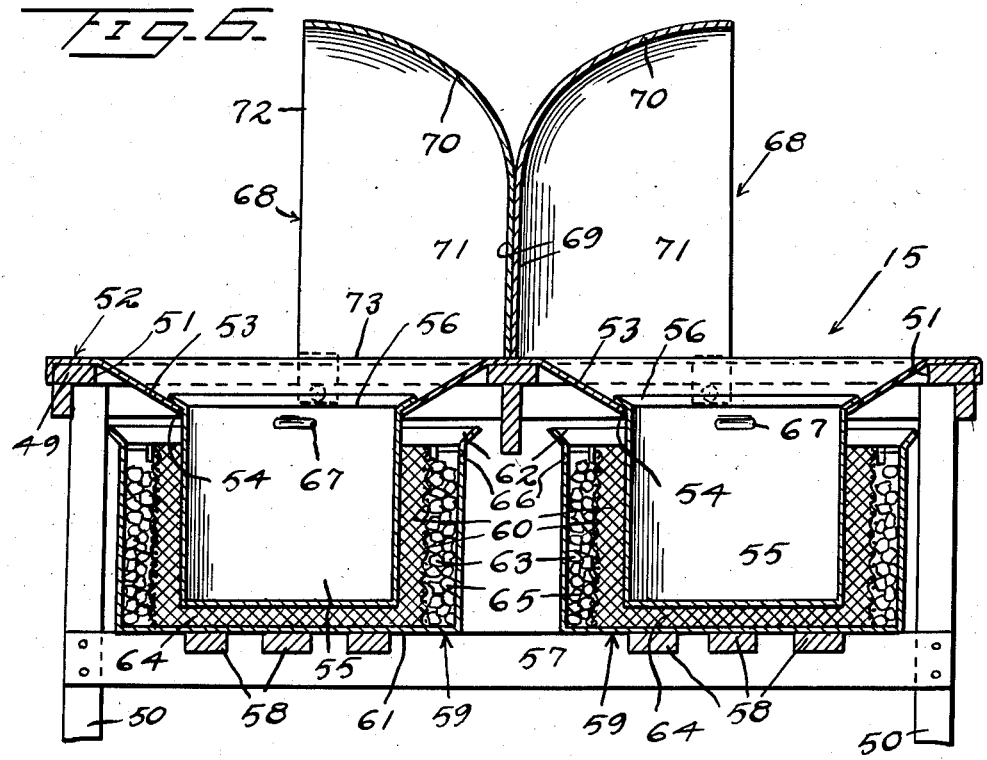
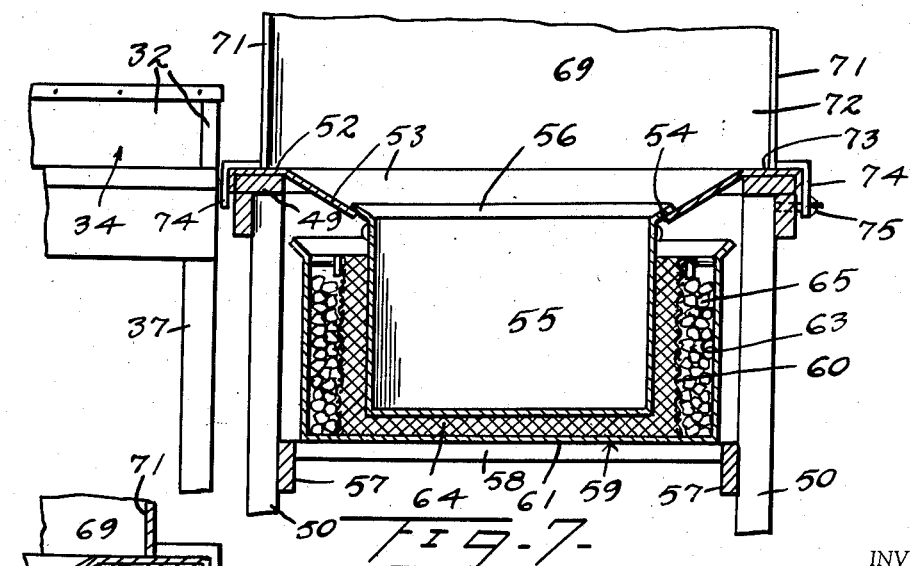

2,838,786

APPARATUS FOR EXTRACTING CRAB MEAT

Jarrett M. Ward, Crisfield, Md.

Application July 20, 1955, Serial No. 523,179

4 Claims. (Cl. 17—2)

This invention relates to a novel apparatus and method for use in preparing partially cleaned marine crabs for removing the meat from the body thereof and to the actual removal of the meat from separated sections of the body.

A large part of crab meat which is canned is obtained by hand cleaning and picking of marine crabs which is a very slow and expensive procedure. Furthermore, crab meat recovered in this manner usually contains considerable amounts of shell particles which substantially reduces the commercial value of the meat.

It is therefore a primary object of the present invention to provide an apparatus and method whereby a partially cleaned crab may be readily cut for removing the knuckles therefrom, after which the crab body containing the meat and from which the viscera has been removed may be cut approximately in half between and parallel to its ventral side and the upper side thereof from which the top shell or carapace has been removed, to thereby completely expose the body meat to permit the ready removal thereof from the skeleton halves of the body by a fluid medium under pressure.

More particularly, it is an aim of the present invention to provide such an apparatus and method through the use of which body meat extracted from the bony parts of the separated halves of the body will be substantially free from shell particles to thus provide a high grade crab meat best suited for canning.

Still a further object of the invention is to provide a novel means for quickly and accurately cutting off the knuckles and for cutting the crab body in half by a slicing action which will not leave shell fragments embedded in the crab meat.

Various other objects and advantages of the invention will hereinafter become more fully apparent from the following description of the drawings, illustrating a presently preferred embodiment of the apparatus of the invention, and wherein:

Figure 1 is a top plan view, partly in section, of the apparatus;

Figure 2 is an enlarged fragmentary longitudinal sectional view taken substantially along a plane as indicated by the line 2—2 of Figure 1 with parts broken away;

Figure 3 is an enlarged fragmentary transverse sectional view, taken substantially along a plane as indicated by the line 3—3 of Figure 1;

Figure 4 is an enlarged fragmentary transverse sectional view taken substantially along a plane as indicated by the line 4—4 of Figure 1 with parts broken away;

Figure 5 is an enlarged fragmentary longitudinal sectional view, taken substantially along a plane as indicated by the line 5—5 of Figure 1;

Figure 6 is an enlarged vertical sectional view taken substantially along a plane as indicated by the line 6—6 of Figure 1, longitudinally through a part of the apparatus;

Figure 7 is an enlarged transverse vertical sectional view taken substantially along a plane as indicated by the line 7—7 of Figure 1;

Figure 8 is an enlarged fragmentary plan view, partly in horizontal section, taken substantially along a plane as indicated by the line 8—8 of Figure 2;

Figure 9 is an enlarged fragmentary plan view, partly in horizontal section, taken substantially along a plane as indicated by the line 9—9 of Figure 4;

Figure 10 is an enlarged fragmentary transverse sectional view, taken substantially along a plane as indicated by the line 10—10 of Figure 1, and Figure 11 is an enlarged fragmentary vertical sectional view, taken substantially along a plane as indicated by the line 11—11 of Figure 1.

Referring more specifically to the drawings, the apparatus in its entirety and comprising the invention is designated generally 12 and includes a table or similar supporting structure, designated generally 13, a second table or the like, designated generally 14, and a supporting frame structure, designated generally 15.

The table 13 includes a table-top 16 surrounded by upstanding walls 17 except at one corner 18 thereof. The table 13 is provided with suitable supporting legs which may depend, for example, from the corners of the table-top 16 thereof, one of which is shown at 19 in Figure 2. The upper side of the table-top 16 and the inner sides of the walls 17 are preferably lined or covered with a suitable lining 20, such as sheet metal, as seen in Figure 2. The table 13 is preferably of elongated rectangular shape and is provided with a slot 21 in the table-top 16 and the covering strip 20 thereof. The slot 21 is disposed transversely of the table-top 16 and adjacent the corner 18 thereof.

The frame 22 of a band saw, designated generally 23, is disposed adjacent the corner 18, partially thereabove and partially therebeneath, and may be supported in any suitable manner relatively to the table 13, as by a supporting structure 24 which is disposed beneath said corner 18, having depending supporting legs 25, and on the top of which the band saw frame 22 is suitably secured, as by fastenings 26. A portion of the blade 27 of the band saw 23 extends loosely through the slot 21, as best illustrated in Figure 3. An elongated bar or cleat 28 is secured against the upper side of the table-top 16, as by fastenings 29, and is disposed transversely of the table 13 and between the slot 21 and the adjacent table end. A portion of the longitudinal edge of the cleat 28, which is located adjacent the slot 21, is provided with an arcuate recess 30, which extends to substantially beyond the ends of the slot 21, as best illustrated in Figure 8.

The table 14 includes a substantially L-shaped table-top 31 having upstanding walls 32 rising from the edges thereof except at the outer corner or apex 33 of the two arms 34 and 35 of the table. The table-top 31 on its upper side is preferably covered by a covering 36, as seen in Figures 4 and 5, which likewise preferably lines the inner sides of the walls 32. The lining 36 may correspond with the lining 20. The outer end of the shorter arm 35 of the table 14 preferably abuts against the longitudinal side of the table 13, which is disposed remote from the slot 21 and corner 18. The table 14 is supported by suitable supporting legs 37, certain of which are seen in Figures 4 and 5. The table-top 36 is provided with an elongated slot 38, which extends through a part of the covering 36 and which is disposed adjacent the corner 33 and parallel to the axis of the longer arm 34 of the table.

A band saw-type power cutter designated generally 39 is supported by a supporting structure 40, which may correspond to the support 24 and which is disposed beneath the corner 33. The cutter 39 has a part disposed above the slot 38 and another part disposed therebeneath and between which a portion of an endless flexible cutting blade 41 extends and is movable loosely through the slot 38.

An elongated guide bar or fence 42 is mounted on the upper side of the table-top 31, longitudinally of the arm 34 and between the slot 38 and a longitudinal edge of said arm 34, which is located adjacent to the slot 38 and remote from the arm 35. The guide bar 42 is adjustably secured to the table portion 34 by a bolt and wing nut fastenings 43 which extend therethrough and through elongated slots 44 of the table-top 31. The slots 44 are disposed crosswise of the longitudinal axis of the table portion 34 and permit adjusting of the guide bar 42 toward and away from the slot 38 and securement of said guide bar in different adjusted positions by tightening the fastenings 43. An elongated feed block 45 is loosely disposed on the upper side of the table-top 31 and has a forward end 46 provided with an elongated notch 47 which opens outwardly of said end and of an inner longitudinal edge 48 of said block. The edge 48 is adapted to slidably engage the longitudinal edge of the guide bar 42, which is disposed adjacent the slot 38, for a purpose that will hereinafter be described.

The supporting frame structure 15 is preferably of elongated rectangular shape and includes a top portion 49 which is supported by corner legs 50. The top portion 49 is of openwork construction having two relatively large rectangular openings 51, one of which is located adjacent each end thereof. The top portion 49 contains a covering 52, preferably formed of sheet metal, having downwardly inclined flange portions 53 extending into each of the openings 51 and defining rectangular openings 54 in the cover 52, which are disposed beneath the openings 51 and centrally with respect thereto.

A substantially rectangular container 55 extends downwardly from each opening 54 and is provided with an open top having an outturned surrounding flange 56 which is properly flared to rest on the flanges 53 which surround the opening 54 in which the container 55 is disposed, whereby said containers 55 are supported by the flanges 53 in the openings 54.

The supporting structure 15 includes longitudinal braces 57, the ends of which are secured to the legs 50. Cross members 58 extend between and are secured at their ends to the braces 57. Said cross members 58 have upper surfaces disposed substantially flush with upper edges of the braces 57, as seen in Figures 6 and 7.

The cross members 58 support a pair of receptacles 59, the open tops of which are disposed beneath the two sets of flanges 53 of the cover 52. The containers 55 extend into the receptacles 59 and have their bottoms terminating above and adjacent the level of the bottoms of the receptacles 59, as seen in Figures 6 and 7. The receptacles 59 are of a size to loosely accommodate the containers 55 and are provided with internal side and end walls 60, preferably formed of mesh wire fabric which extend from the bottoms 61 of the receptacles 59 to adjacent the open tops 62 thereof. Said foraminous inner walls 60 combine with the side and end walls of the receptacles 59 to form open top chambers 63 which surround central chambers 64 of the receptacles 59, into which central chambers the containers 55 extend. The surrounding chambers 63 are adapted to be filled with a cooling medium such as cracked ice, as seen at 65, for chilling the container portions 55 which are disposed in the receptacles 59. The receptacles 59 are each provided with an overflow drain port 66 in one wall thereof, as seen in Figure 6, which drain port is located adjacent the open top 62.

The end walls of the containers 55 are provided with inwardly opening indentations 67, adjacent portions of the flanges 56, forming handgrips by which the containers 55 can be grasped for applying them to or removing them from their supported positions in the openings 54 as seen in Figures 6 and 7. It will be apparent that the receptacles 59 can be slidably removed from or applied to the supporting structure 15 through either longitudinal side thereof, when the containers 55 are removed.

The supporting structure 15 is also equipped with a pair of shields, designated generally 68, having rear walls 69 which are disposed in back to back engagement and which rest on the cover 52, intermediate of the ends of the supporting structure 15. The shields 68 include upwardly and outwardly flared top portions 70, forming extensions of the rear walls 69. Each shield 68 has corresponding side walls 71, the bottom edges of which rest on side edge portions of the cover 52, as seen in Figure 7. The shields 68 have open fronts 72 which are disposed above the openings 54, substantially midway between remote and adjacent edges thereof. Said shields 68 likewise have open bottoms 73, as seen in Figures 6 and 7. The side walls 72 are preferably provided with outwardly offset depending strap extensions 74 which straddle the longitudinal sides of the supporting structure 15, one or more of which extensions of each shield 68 may be detachably secured to the supporting structure 15, as by fastenings 75.

The apparatus 12 also includes means, designated generally 76, for supplying a fluid medium under pressure to the end portions of the supporting structure 15 and which includes nozzles 77, one of which is located adjacent each end of the supporting structure 15. The nozzles 77 are provided with suitable control valves, not shown, which are manually actuated and controlled by suitable actuating elements 78. The nozzles 77 are connected to discharge ends of flexible conduits or hoses 79, opposite ends of which are connected to a suitable source of a fluid medium under pressure, such as a storage tank 80. The storage tank 80 is shown mounted on a supporting base 81 which additionally supports a conventional pump 82 and a motor 83. The motor 83 is connected by a driving connection 84 to the pump 82. The pump 82 is in turn connected to the tank 80 for recharging said tank. The pump 82 preferably constitutes an air pump for charging the tank 80 with compressed air.

The apparatus is utilized for removing meat from the bodies of crabs, after the crabs have been hand cleaned. Hand cleaning of crabs, involves removal of the claws and legs, apron and shell or carapace, and the viscera all of which can be very expeditiously accomplished. A crab as thus cleaned and shown with its ventral side facing upwardly, is illustrated in Figure 8 and designated generally C. The crabs as thus hand cleaned may be placed upon the right hand end of the table-top 16, as seen in Figure 1. The operator standing adjacent the longitudinal side of the table 13 which is located remote from the table 14, can then conveniently grasp the crabs C one at a time for cutting off the knuckles J thereof. This is accomplished by grasping the crab C along one knuckled edge while moving the other knuckled edge lengthwise along the arcuate recess 30 in a direction toward the toothed longitudinal edge 85 of the band saw blade 27, which is being driven downwardly through the slot 21. After the knuckles J have been thus cut from one edge of the body of the crab, the crab is turned around and the operation repeated for cutting the knuckles J from the other edge thereof. This constitutes a completion of the first operation performed at the first station of the apparatus 12, which comprises the table 13 and band saw 23. After this operation has been performed on the crab C, the crab can be placed by the aforementioned first operator on the arm 35 of the table-top 31 within convenient reach of a second operator who stands beyond the left-hand edge of the corner 33, as seen in Figure 1.

The guide bar 42 is adjusted, as previously described, so that when the feed block 45 is disposed as seen in Figure 1, the longitudinal wall of the notch 47 thereof and the adjacent edge of the bar 42 will straddle and be spaced equal distances from the blade 41, as best seen in Figure 4. The second operator then moves the block 45 from right to left of its position of Figure 1 so that the notch 47 will be located adjacent the left-hand end of the guide bar 42. A crab body C', from which the knuckles have been cutoff, is then placed in the notch 47 with an edge thereof resting on the table-top 31 and with one side of the body bearing against the longitudinal wall of the notch 47 and the other side thereof bearing against the adjacent longitudinal edge of the guide bar 42, as seen in Figure 9. With the feed block 45 held with its surface 48 against the bar 42, said feed block is then moved from left to right toward the cutting edge 86 of the blade 41 for advancing the crab body C', from which the joints have been cutoff, toward and past the blade 41, so that the crab body will be cut substantially in half midway between the ventral side thereof and the opposite side from which the carapace has been removed, as illustrated in Figure 9. The cutting edge 86 of the blade 41, as illustrated in Figure 5, preferably comprises an undulating sharpened edge which faces toward one side of the corner 33 and which thus differs from the conventional saw-toothed edge 85 of the blade 27. This constitutes the only difference between the cutter 39 and the conventional band saw 23. The slicing edge 86 is provided so that a clean cut will be made through the surrounding wall of the crab body and through the longitudinal and transverse partition walls thereof. Thus, no fragments of these thin shell like walls will be left in the meat of the crab body C'. After the crab body C' has thus been cut into two halves by the cutting edge 86, the two halves are deposited by the second operator adjacent the distal end of the table arm 34, which abuts against the intermediate portion of one longitudinal side of the supporting structure 15.

The supporting structure 15 constitutes the third and last station of the apparatus 12. One operator may be disposed beyond each end of the supporting structure 15, each of whom performs the same operation. Each operator at the third station holds the nozzle 77 in one hand which is located adjacent the end of the supporting structure, adjacent to which he is standing. The operator grasps a half of the crab body C' with the other hand, holding the outer or shell side against the palm of the hand so that the cut open side will be facing outwardly of the hand. The hand holding the crab half is then placed adjacent the open top of the adjacent container 55. Pressure is then applied to the valve actuator 78 with the hand holding the nozzle 77 and the nozzle is held so that the compressed air or other fluid medium under pressure will be directed into the open cut side of the crab half in a direction toward the open front 72 of the adjacent shield 68. The exposed crab meat will thus be effectively blown out of the crab half into the container 55. Any crab meat not entering the container 55 will be blown into the adjacent shield 68 from which it can be readily recovered.

The crab meat, not shown, within the container 55 will be kept chilled by the surrounding receptacle 59 until said container 55 has been filled, removed from the supporting structure 15 and the crab meat emptied therefrom. The shell halves may be deposited in a suitable receptacle, not shown, located adjacent each operator at the third station. It will thus be readily apparent that by utilization of the apparatus 12, the body meat may be very expeditiously removed from crabs in a manner so that the recovered body meat will be substantially free of shell particles.

If desired, table-tops 16 and 31 may be provided with slots 87 and 88, respectively, which communicate with the slots 21 and 38 and which open outwardly of edges of the corners 18 and 33, respectively, thereof, to facilitate positioning the blades 27 and 41 in engagement with the slots 21 and 38, respectively, or for removal of the blades therefrom. While the units 13, 14 and 15 constituting the three stations of the apparatus 12 have been shown as separate units to facilitate handling thereof, it will be readily apparent that said parts could be integrally joined as a single unit, if desired.

Various other modifications and changes are contemplated and may obviously be resorted to, without departing from the function or scope of the invention as hereinafter defined by the appended claims.

I claim as my invention:

1. An apparatus of the character described comprising a support having a slot extending therethrough, a driven cutting blade movable through said slot in a direction substantially perpendicular to the support, an elongated cleat secured to said support and having a longitudinal edge disposed adjacent to the slot and to a portion of the blade which is disposed adjacent to the slot, and said cleat having a curved recess opening through said longitudinal edge, spaced from and disposed substantially conformably around an adjacent side of said blade portion, said recess defining a guide surface adapted to be engaged by extremities of the knuckles of a crab body for guiding the crab body while being manually moved relative to said blade portion for cutting off the knuckles engaging said guide surface.

2. An apparatus as in claim 1, a second support having a slot extending therethrough, a second driven cutting blade movable through the slot of said second support in a direction substantially perpendicular to the second support, an elongated guide bar mounted on said second support on one side of and substantially parallel to the slot of the second support and a portion of the second blade which is disposed adjacent said slot, a feed block slidably mounted on the second support and guided by slidable engagement with said guide bar for movement toward and away from said blade portion of the second blade, and said feed block having means associated therewith for supporting a crab body therein positioned to be cut in half between top and bottom sides of the crab body as the feed block is advanced in one direction toward the second blade, said second blade having an undulating cutting edge for executing a slicing cut of the crab body.

3. An apparatus as in claim 2, an open top container for crab meat, and means associated with the container for blowing the crab meat from the cut halves of the crab body into said container.

4. An apparatus as in claim 3, and means associated with said second support for adjustably positioning said guide bar relative to the second blade for adjustably positioning said means associated with the feed block to accommodate crab bodies of different thicknesses.

References Cited in the file of this patent

UNITED STATES PATENTS

| | | |
|---|---|---|
| 956,706 | Greiner | July 26, 1910 |
| 1,617,484 | Holt | Feb. 15, 1927 |
| 1,793,189 | Peters | Feb. 17, 1931 |
| 1,803,489 | Schueren | May 5, 1931 |
| 2,080,263 | Gibson | May 11, 1937 |
| 2,522,578 | Johnson | Sept. 19, 1950 |
| 2,525,604 | Johnson | Oct. 10, 1950 |